United States Patent
Kurpejovic et al.

(10) Patent No.: US 11,492,942 B2
(45) Date of Patent: Nov. 8, 2022

(54) EXHAUST GAS HEATER

(71) Applicant: Purem GmbH, Neukirchen (DE)

(72) Inventors: Enver Kurpejovic, Kirchheim unter Teck (DE); Fatih Uysal, Plochingen (DE); Holger Prommersberger, Korntal-Muenchingen (DE); Dietmar Kuschel, Murr (DE); Sandra Hoeckel, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/237,610

(22) Filed: Apr. 22, 2021

(65) Prior Publication Data

US 2021/0332730 A1   Oct. 28, 2021

(30) Foreign Application Priority Data

Apr. 22, 2020   (DE) .................... 10 2020 110 869.9

(51) Int. Cl.
    *F01N 3/20*   (2006.01)

(52) U.S. Cl.
    CPC ................. *F01N 3/2026* (2013.01)

(58) Field of Classification Search
    CPC .... F01N 2240/16; F01N 3/027; F01N 3/2013; F01N 3/2026
    See application file for complete search history.

(56) References Cited

U.S. PATENT DOCUMENTS

| | | | | |
|---|---|---|---|---|
| 2,426,466 A | * | 8/1947 | Minarik | H01B 17/24 174/156 |
| 3,176,117 A | * | 3/1965 | Knoll | F24H 3/0411 392/360 |
| 4,548,625 A | * | 10/1985 | Ishida | F01N 3/027 422/178 |
| 4,723,973 A | * | 2/1988 | Oyobe | F01N 3/027 219/552 |
| 5,053,603 A | * | 10/1991 | Wagner | F01N 3/027 219/205 |

(Continued)

FOREIGN PATENT DOCUMENTS

| EP | 2 935 996 A1 | 10/2015 | |
|---|---|---|---|
| JP | 60022016 A * | 2/1985 | ............ F01N 3/027 |

(Continued)

OTHER PUBLICATIONS

Machine Translation JP-60022016-A (Year: 1985).*

(Continued)

*Primary Examiner* — Anthony Ayala Delgado
(74) *Attorney, Agent, or Firm* — Walter Ottesen, P.A.

(57) ABSTRACT

An exhaust gas heater for an exhaust gas system of a combustion engine includes a carrier and a heating conductor supported on the carrier. The heating conductor includes a heating region arranged on an axial side of the carrier, wherein the heating conductor is electrically uninsulated in its heating region at least in part. A holding arrangement has at least one holding unit which holds the heating conductor on the carrier in its heating region. The holding unit includes at least one electrically conducting holding block which is in contact with the heating conductor in an electrically uninsulated region of the heating region. The holding block is electrically insulated with respect to the carrier.

26 Claims, 2 Drawing Sheets

(56) References Cited

U.S. PATENT DOCUMENTS

| | | | | |
|---|---|---|---|---|
| 9,375,682 B2* | 6/2016 | Maus | ............ | F01N 3/208 |
| 10,801,388 B2* | 10/2020 | Culbertson | ............ | F01N 13/008 |
| 2004/0221572 A1* | 11/2004 | Treiber | ............ | F01N 13/009 |
| | | | | 60/297 |
| 2005/0063689 A1* | 3/2005 | Auber | ............ | F02M 31/125 |
| | | | | 392/468 |
| 2015/0267596 A1* | 9/2015 | Tobben | ............ | F01N 13/08 |
| | | | | 60/274 |
| 2019/0112962 A1* | 4/2019 | Gaiser | ............ | F01N 13/141 |

FOREIGN PATENT DOCUMENTS

| | | |
|---|---|---|
| JP | 4-164115 A | 6/1992 |
| WO | 90/12201 A1 | 10/1990 |
| WO | 2014/100118 A1 | 6/2014 |

OTHER PUBLICATIONS

NPL https://www.thoughtco.com/table-of-electrical-resistivity-conductivity-608499 (Year: 2017).*
U.S. Appl. No. 16/951,816, filed Nov. 18, 2020, (corresponds to DE102019131556—unpublished).

* cited by examiner

EXHAUST GAS HEATER

CROSS REFERENCE TO RELATED APPLICATION

This application claims priority of German patent application no. 10 2020 110 869.9, filed Apr. 22, 2020, the entire content of which is incorporated herein by reference.

TECHNICAL FIELD

The present disclosure relates to an exhaust gas heater for an exhaust gas system of a combustion engine, which exhaust gas heater can be used in particular to heat the exhaust gas that is to flow to a catalytic converter unit.

BACKGROUND

FIG. 1 of the drawings herein shows a portion of an exhaust gas system of a combustion engine, in particular in a vehicle. The exhaust gas system is known from post-published German patent application DE 10 2019 131 556 (corresponding to U.S. application Ser. No. 16/951,816, filed Nov. 18, 2020, and incorporated herein by reference). In FIG. 1 of this application, the exhaust gas system is designated generally by reference numeral 10.

The exhaust gas system 10 includes an exhaust gas routing component 12 in the form of, for example, an exhaust pipe, in which an exhaust gas heater 14 is arranged in the length region shown. Downstream of the exhaust gas heater 14 in an exhaust gas main flow direction H there is arranged a catalytic converter unit representing an exhaust gas treatment unit by way of example. The catalytic converter unit can include a catalytic converter block which is coated with catalytically active material and is held stably in the exhaust gas routing component 12 by, for example, a fiber mat or the like.

The exhaust gas heater 14 includes a carrier 22 in the form of a shaped sheet-metal part. The carrier 22 has an outer circumferential region 24, which is located radially on the outside with respect to a heater longitudinal axis A, and a central region 26, which is located centered with respect to the heater longitudinal axis A. Between the outer circumferential region 24 and the central region 26 there extends a carrying region, designated generally 28, of the carrier 22. The carrying region 28 has a substantially conical or cone-like or funnel-like shape, so that the outer circumferential region 24 and the central region 26 are axially offset with respect to one another in the direction of the heater longitudinal axis A. In the radially outer region of the carrier 22, the carrier has, starting from the outer circumferential region 24, a plurality of fastening portions. The fastening portions are bent axially and lie against an inner circumferential surface of the exhaust gas routing component 12 and are fixed thereto, for example, by welding or soldering.

The carrier 22 has connecting webs or struts 36, which connect the outer circumferential region 24, which is, for example, of ring-like form, with the central region 26. Each of the four connecting webs 36 extends approximately linearly from radially outside to radially inside. In the circumferential direction between two mutually directly adjacent connecting webs 36 there are formed, in a radially staggered manner, a plurality of throughflow openings 38 which extend approximately in the circumferential direction between two connecting webs 36.

The exhaust gas heater 14 further includes a heating conductor 42. The heating conductor 42 has a heating region 44 which is arranged on an axial side 34, oriented in the upstream direction, of the carrier 22, or of the carrying region 28 thereof, and which is substantially electrically uninsulated. The heating conductor 42 extends in that heating region 44, starting from a radially outer end portion positioned in the region of the outer circumferential region 24 of the carrier 22 to a radially inner end portion with a spirally wound structure located in the region of the central region 26. Owing to the spirally wound structure, the heating region 44 of the heating conductor 42 has a plurality of winding portions 20 arranged in a radially staggered manner. On the rear side, oriented in the downstream direction, of the carrier 22, a connecting region, adjoining the heating region 44 radially on the inside, of the heating conductor 42 can extend radially outwards and be guided with a further connecting region adjoining the heating region 44 radially on the outside through the exhaust gas routing component 12, in order to provide two electrical connection contacts 30, 32.

With its heating region 44, the heating conductor 42 is fixed to the carrier 22 by a holding arrangement 16. The holding arrangement 16 includes groups of holding elements 18 provided in particular in the region of the connecting webs 36. Each holding element 18 surrounds the heating conductor 42 in the region of a respective winding portion 20 in its metal sleeve 46 fixed to the carrier 22, for example, by welding. In order to electrically insulate the electrically uninsulated heating region 44 with respect to the carrier 22, insulating material is provided inside the metal sleeves 46, which insulating material surrounds the heating region 44 in the region of a respective winding portion 20 and provides electrical insulation between the heating region 44 and a respective metal sleeve 46.

SUMMARY

An object of the present invention is to configure an exhaust gas heater in such a manner that, with high heat transfer efficiency, local overheating of a heating conductor of the exhaust gas heater is avoided.

The exhaust gas heater is for an exhaust gas system of a combustion engine and includes: a carrier, preferably having an outer circumferential region which is arranged radially on the outside with respect to a heater longitudinal axis, and a central region; a heating conductor being carried on the carrier, wherein the heating conductor includes a heating region arranged on an axial side of the carrier, wherein the heating conductor is electrically uninsulated in its heating region at least in part; and, a holding arrangement having at least one holding unit which holds the heating conductor on the carrier in its heating region.

The at least one holding unit includes at least one electrically conducting holding block which is in contact with the heating conductor in an electrically uninsulated region of the heating region, wherein the at least one holding block is electrically insulated with respect to the carrier.

In the structure according to the disclosure, the electrically uninsulated heating region is contacted by one or more electrically conducting holding blocks and held on the carrier via those blocks. Each holding block thus electrically conductively connected to the heating region is electrically connected in parallel with the heating region and permits a current flow which bypasses the heating region in the length region that is enclosed by the holding block, with the consequence that the electric current, owing to the electrically conducting property of a respective holding block, will flow primarily through the holding block and not through the length region of the heating region that is enclosed by the holding block. The consequence thereof is that, in this length region that is enclosed by a heating block, the heating region of the heating conductor will not warm up, or will warm up only slightly, and heat accumulation in that region, and thus overheating of the heating conductor, is accordingly avoided.

For stable holding, the at least one holding block can have a heating conductor receiving recess or cutout which receives the heating conductor.

In order to produce full-surface contact which avoids local overloads, an inner contour of the receiving recess can be adapted to an outer circumferential contour of the heating conductor.

The receiving of the heating region in a respective holding block can be achieved in a simple manner in that the at least one holding block includes two holding block parts which receive the heating region between them.

A uniform holding interaction with the heating region can thereby be achieved in that a portion of the receiving recess is formed in each of the holding block parts.

In order to ensure that a large portion of the current flowing through the heating conductor is conducted through the holding block or blocks, it is proposed that the at least one holding block is constructed of metal material, preferably steel material, or/and that the at least one holding block has a resistivity of less than 1 $\Omega mm^2/m$.

The required electrical insulation, in particular in respect of the carrier, can be achieved in that insulating material is arranged between the at least one holding block and the carrier.

For stable holding on the carrier, the at least one holding block can be held on the carrier by a holding stirrup or holding bracket.

A structure that is simple to produce but nevertheless ensures the required electrical insulation can be ensured in that the holding stirrup is in the form of a metal component, preferably a shaped sheet-metal part, and in that insulating material is arranged between the at least one holding block and the holding stirrup.

The insulating material can include ceramics material or mica material. Such material is not only capable of achieving the required electrical insulation, but is also resistant to the mechanical and thermal loads which occur in operation.

The holding stirrup or holding bracket can be fixed to the carrier by at least one fastening member, preferably threaded bolt.

For a structure that is simple, stable, but nevertheless also inexpensive to produce, it is proposed that the carrier is in the form of a metal component, preferably a shaped sheet-metal part.

A large surface area for thermal interaction with the exhaust gas, or an exhaust gas treatment unit, such as, for example, a catalytic converter, can be achieved in that the heating conductor is spirally wound in its heating region and includes a plurality of winding portions located in a radially staggered manner.

In order thereby to achieve stable holding of the heating conductor, at least one holding unit can include a plurality of holding blocks, wherein each holding block engages around at least one winding portion. It can further be provided that the holding stirrup engages over the plurality of holding blocks on their side remote from the carrier, or/and that the holding stirrup extends substantially radially along the plurality of holding blocks.

The carrier can include a plurality of connecting webs which are arranged at a circumferential distance from one another and connect a central region with an outer circumferential region, wherein throughflow openings are formed between connecting webs that are directly adjacent to one another in the circumferential direction, wherein at least one holding unit is arranged in the region of a connecting web.

The disclosure relates further to an exhaust gas system including a preferably tubular exhaust gas routing component and an exhaust gas heater according to one of the preceding embodiments arranged in the exhaust gas routing component.

BRIEF DESCRIPTION OF THE DRAWINGS

The invention will now be described with reference to the drawings wherein.

DESCRIPTION OF THE PREFERRED EMBODIMENTS

Figure 1:
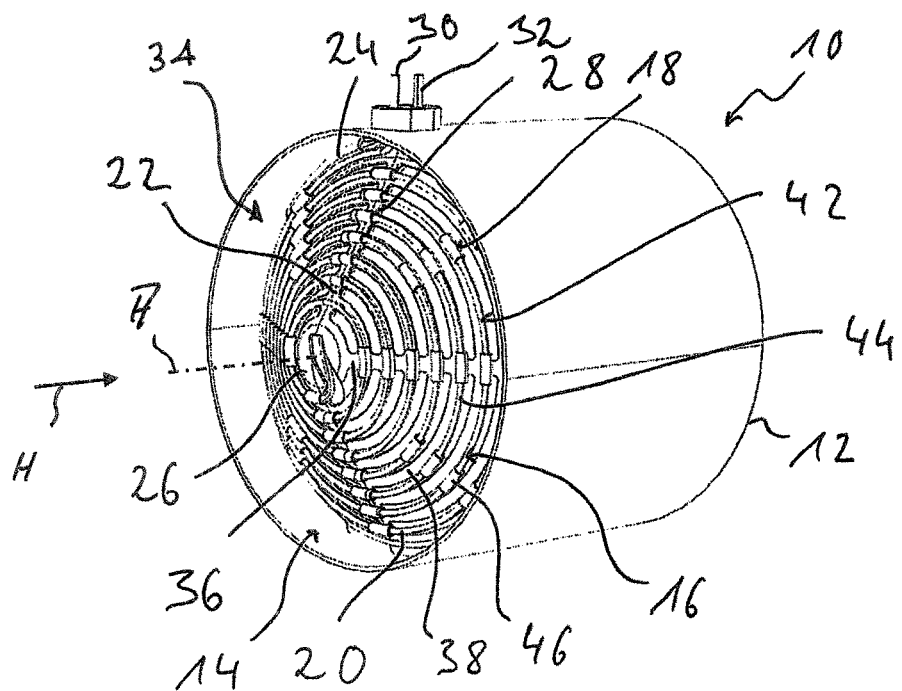
FIG. 1 is a perspective view of part of an exhaust gas system for a combustion engine having an exhaust gas heater.

The structure of an exhaust gas heater 14 will be described hereinbelow with reference to FIGS. 2 and 3. Components which correspond in terms of structure or function to components described hereinbefore with reference to FIG. 1 are designated with the same reference numerals. It should be noted that the incorporation of an exhaust gas heater 14 as can be described hereinbelow with reference to FIGS. 2 and 3 into an exhaust gas system of a combustion engine can be accomplished as described hereinbefore with reference to FIG. 1. Reference will therefore be made in this respect to the remarks relating to FIG. 1.

Figure 2:
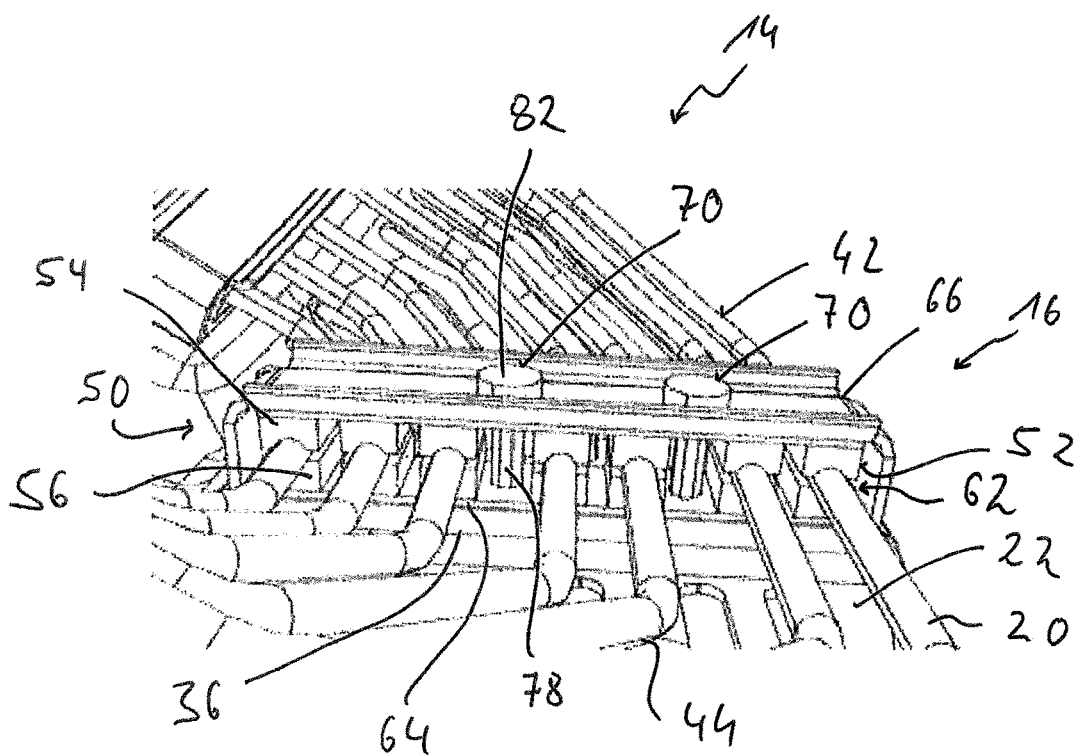
FIG. 2 shows a portion of an exhaust gas heater with a heating conductor held on a carrier by a holding unit of a holding arrangement; and, FIG. 3 is an enlarged detail view of the holding unit shown in FIG. 2 except that the heating conductor is omitted from the holding block on the far right end of the holding unit.
Figure 3:
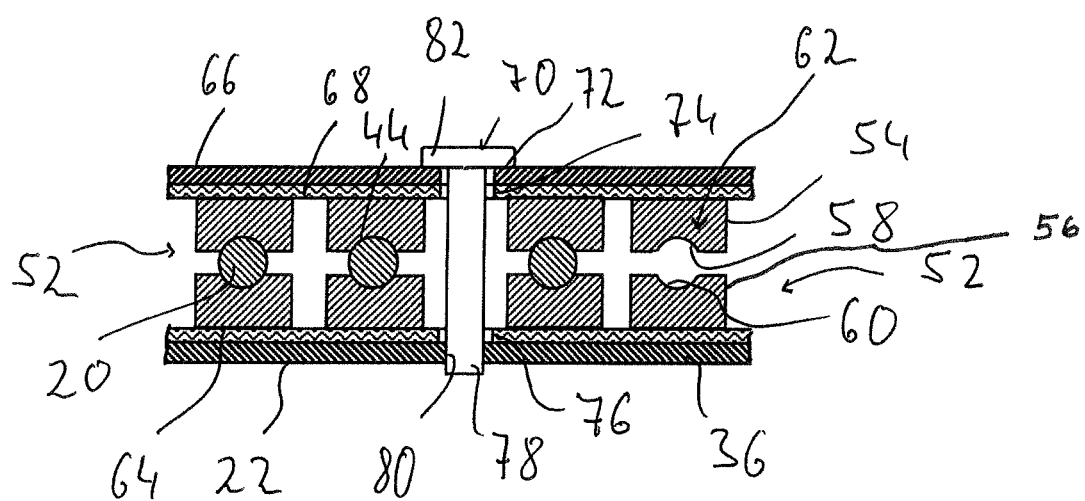

In the structure shown in FIGS. 2 and 3 of an exhaust gas heater 14, the heating conductor 42, or the heating region 44 thereof, which is spirally wound and thus has a plurality of winding portions 20 located in a radially staggered manner with respect to one another and which is preferably not completely surrounded by an electrically insulating jacket, that is, is substantially electrically uninsulated, is held on the carrier 22 by a plurality of holding units 50 of the holding arrangement 16, which holding units are distributed in the circumferential direction, for example are each arranged in the region of a connecting web 36. Each such holding unit 50 extends substantially from radially on the inside to radially on the outside along a respective connecting web 36 and includes, for example, associated with each of the radially staggered winding portions 20 of the heating region 44, an electrically conducting holding block 52. In the embodiment shown, each of the holding blocks 52, which are arranged at a distance from one another, is formed with two holding block parts 54, 56 which are, for example, identical to one another and receive between them a respective winding portion 20 of the heating region 44. In order to allow the winding portions to be received between the two holding block parts 54, 56 in a manner that is stable, full-surface and avoids overloads, each of the holding block parts has a portion 58, 60 of a receiving recess or cutout designated generally 62 and adapted to the outer circumferential contour of the heating region 44 of the heating conductor 42. The portions 58, 60 of the receiving recess 62 are identified in the far-right holding block 52 where the heating conductor 42 is omitted for clarity. In the example shown, the heating conductor 42 has a circular outer circumferential contour in its heating region 44, so that each portion 58, 60 of the receiving recess 62 also has a corresponding concave, circular segment-like geometry.

Between the carrier 22, constructed in the form of a shaped sheet-metal part, and the holding blocks 52, or the holding block parts 56 thereof, there is arranged a layer of insulating material 64. The insulating material 64 can be sheet-like and supported substantially along the holding blocks 52 on the associated connecting web 36. By means of the insulating material 64, which is composed, for example, of ceramics material or mica material and accordingly has a very high electrical resistance, the holding blocks 52 are electrically insulated with respect to the carrier 22.

In order to hold the holding blocks 52 stably on the carrier 22 there is provided a holding bracket or holding stirrup 66, which, for example, is likewise in the form of a shaped sheet-metal part. The holding stirrup 66 also extends substantially in the radial direction along the holding blocks 52, or the associated connecting web 36. Between the holding stirrup 66 and the holding block parts 54 of the holding blocks 52 there is arranged a layer of insulating material 68. This insulating material, for example sheet-like insulating material, for example ceramics material or mica material, also extends along the holding blocks 52 and provides electrical insulation between the holding blocks 52, or the holding block parts 54 thereof, and the holding stirrup 66.

In the example shown, the holding stirrup 66 is fixed to the carrier 22 by two fastening members 70. The fastening members 70, which are in the form of threaded bolts, for example, are guided through openings 72, 74 and 76 in the holding stirrup 66, the layer of insulating material 68 and the layer of insulating material 64. A shaft region 78 formed at least in part with an external thread is screwed, for example, into an internally threaded opening 80 of the carrier 22. A head 82 of a respective fastening member 70 bears against the side of the holding stirrup 66 that is remote from the carrier 22 and thus presses the holding stirrup, with the interposition of the two layers of insulating material 64, 68, the holding block parts 54, 56 and the winding portions 20, positioned therebetween, of the heating region 44, in the direction towards the carrier 22. In this manner, the heating region 44 is held on the carrier 22 in an electrically insulated manner.

The holding action between the fastening members 70 and the carrier 22 could also be achieved, for example, in that the fastening members in their shaft regions 78 extending beyond the carrier 22 are screwed into a nut that bears against the carrier 22. Alternatively or in addition, the fastening members can be secured against loosening in that, for example, they are fixed by substance-to-substance bonding, for example welding, with their shaft regions 78, for example, with respect to the carrier 22, or such nuts. Furthermore, a further holding stirrup which corresponds substantially to the holding stirrup 66 could be positioned between the layer of insulating material 64 and the carrier 22, so that the two layers of insulating material 64, 68, the holding block parts 54, 56 and the winding portions 20, positioned therebetween, of the heating region 44 are held between two such holding stirrups, which are braced against one another, for example, by one or more of the fastening members 70. This assembly can then be fixed to the carrier 22 by those fastening members or other, additional fastening members.

The holding blocks 52 are constructed of electrically conducting material which has a very low specific resistance and, in particular owing to the dimensioning, also a low total resistance. Since the holding blocks 52 are in contact with the electrically uninsulated heating region 44 of the heating conductor 42 preferably in each case substantially along the entire length portion of the winding portions 20 that is enclosed by the holding blocks, they form a parallel path for the electric current conducted through the heating region 44 in the region of the length portions of the heating region 44 that are enclosed by the holding blocks 52. In particular, it can thereby be provided that the electrical resistance provided by the holding blocks 52 is lower than the electrical resistance of the heating region 44 in the length regions that are enclosed by the holding blocks 52, so that the electric current, owing to the parallel connection of the holding blocks 52 and the winding portions 20, will flow primarily through the holding blocks 52. This has the consequence that, owing to the comparatively small current flow through the length portions of the heating region 44 that are enclosed by the holding blocks 52, the heating conductor 42 in the form of a resistance conductor will not warm up or will warm up only comparatively slightly in those length regions. There is accordingly no risk of an accumulation of heat, which could lead to damage to the heating conductor 42, in the length portions of the heating region 44 that are enclosed in order to produce the holding interaction. Overheating in those regions cannot occur.

The holding arrangement, or the holding units thereof, can be of a different construction to the embodiment described hereinbefore or shown in the figures. For example, the holding blocks can be formed in one piece and have a slot-like opening for receiving the winding portions of the heating region. The blocks can also be in the form of sleeve or tube portions, which can be positioned so as to surround the heating region. The heating region itself could be electrically insulated in part, wherein, owing to the advantageous thermal interaction with the exhaust gas flowing round the heating region, the heating region is preferably wholly electrically uninsulated. When it is partially electrically insulated, the heating region is not electrically insulated at least where it is in holding interaction with the holding units, in order to be able to obtain the effect described hereinbefore of producing a parallel path for the electric current flowing through the heating conductor. In this embodiment too, at least a portion of the electric current will flow through the length portions of the heating region 44 that are enclosed by the holding blocks 52, so that at least slight warming cannot be avoided. Owing to the contact with the electrically conducting holding blocks 52 constructed, for example, of metal material, such as, for example, steel material, the holding blocks also have good thermal conductivity, so that the heat generated in the region of the length portions of the heating region 44 that are enclosed by the holding blocks 52 can readily be dissipated by thermal conduction and also thermal emission via the heating blocks 52. In order to avoid an electrical short circuit between winding portions that are radially staggered relative to one another and located directly adjacent to one another, the holding blocks 52 associated with those winding portions 20 are not in direct mutual contact.

The holding units 50 distributed in the circumferential direction can have different forms or different dimensions in the radial direction relative to one another and in each case hold only a radial region of the heating region 44 on the carrier 22. For example, holding units 50 that hold the radially inner region of the heating region 44 on the carrier 22 and holding units 50 that hold the radially outer region of the heating region 44 on the carrier 22 could be provided alternately in the circumferential direction, wherein the radially inner region and the radially outer region can each include approximately half the radial extension region of the heating region 44.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of a combustion engine, the exhaust gas heater comprising:
   a carrier;
   a heating conductor supported on said carrier;
   said heating conductor defining a heating region arranged on an axial side of said carrier;
   said heating conductor being at least in part electrically uninsulated in said heating region thereof;
   a holding arrangement having at least one holding unit configured to hold said heating conductor in said heating region on said carrier;
   said at least one holding unit including at least one electrically conducting holding block in contact with said heating conductor in said electrically uninsulated region thereof;
   said at least one holding block being electrically insulated with respect to the carrier;
   a holding bracket arranged to hold said at least one holding block on said carrier;
      said holding bracket being configured as a metal component; and,
      insulating material interspersed between said holding bracket and said at least one holding block.

2. The exhaust gas heater of claim 1, wherein said at least one holding block has a receiving recess for receiving said heating conductor therein.

3. The exhaust gas heater of claim 2, wherein said heating conductor defines an outer peripheral contour; and, said receiving recess has an inner contour adapted to said peripheral contour of said heating conductor.

4. The exhaust gas heater of claim 3, wherein said at least one holding block includes two mutually adjacent holding block parts for receiving said heating region therebetween.

5. The exhaust gas heater of claim 4, wherein a portion of said receiving recess is formed in each of said holding block parts.

6. The exhaust gas heater of claim 1, wherein said at least one holding block has at least one of the following properties: being made of metal material and having a specific resistance of less than 1 $\Omega mm^2/m$.

7. The exhaust gas heater of claim 6, wherein said metal material is steel material.

8. The exhaust gas heater of claim 1, further comprising insulating material arranged between said at least one holding block and said carrier.

9. The exhaust gas heater of claim 8, wherein said insulating material is a ceramic material or a mica material.

10. The exhaust gas heater of claim 1, wherein said metal component is configured as a sheet-metal part.

11. The exhaust gas heater of claim 1, wherein said insulating material is a ceramic material or a mica material.

12. The exhaust gas heater of claim 1, further comprising at least one fastening element for fixedly holding said holding bracket on said carrier.

13. The exhaust gas heater of claim 12, wherein said fastening element is a threaded bolt.

14. The exhaust gas heater of claim 1, wherein said carrier is configured as a metal part.

15. The exhaust gas heater of claim 1, wherein said carrier is configured as a sheet-metal part.

16. The exhaust gas heater of claim 1, wherein said heating conductor is configured to be spirally wound in said heating region thereof and to include a plurality of winding turn segments disposed to lie radially staggered.

17. The exhaust gas heater of claim 16, wherein said at least one holding unit includes a plurality of said holding blocks contact engaging corresponding ones of said winding turn segments.

18. The exhaust gas heater of claim 1, wherein said holding unit includes a plurality of said holding blocks having a side facing away from said carrier; and, said holding bracket engages over said plurality of holding blocks at said side thereof facing away from said carrier.

19. The exhaust gas heater of claim 18, wherein said holding bracket extends essentially radially along said plurality of holding blocks.

20. An exhaust gas heater for an exhaust gas system of a combustion engine, the exhaust gas heater comprising:
   a carrier having a central region, an outer peripheral region and a plurality of struts interconnecting said central region and said outer peripheral region;
   said struts being arranged at a circumferential spacing one from the other so as to cause each two mutually adjacent ones of said struts to conjointly define a throughflow opening;
   a heating conductor supported on said carrier;
   said heating conductor defining a heating region arranged on an axial side of said carrier;
   said heating conductor being at least in part electrically uninsulated in said heating region thereof;
   a holding arrangement having at least one holding unit configured to hold said heating conductor in said heating region on said carrier;
   said at least one holding unit being arranged in the region of one of said struts;
   said at least one holding unit including at least one electrically conducting holding block in contact with said heating conductor in said electrically uninsulated region thereof;
   said at least one holding block being electrically insulated with respect to the carrier;
   a holding bracket arranged to hold said at least one holding block on said carrier;
   said holding bracket being configured as a metal component; and,
   insulating material interspersed between said holding bracket and said at least one holding block.

21. An exhaust gas system comprising:
   an exhaust gas guide component for conducting a flow of exhaust gas; and,
   an exhaust gas heater mounted in said exhaust gas guide component;
   said exhaust gas heater including:
   a carrier;
   a heating conductor supported on said carrier;
   said heating conductor defining a heating region arranged on an axial side of said carrier;
   said heating conductor being at least in part electrically uninsulated in said heating region thereof;

a holding arrangement having at least one holding unit configured to hold said heating conductor in said heating region on said carrier;

said at least one holding unit including at least one electrically conducting holding block in contact with said heating conductor in said electrically uninsulated region thereof;

said at least one holding block being electrically insulated with respect to the carrier;

a holding bracket arranged to hold said at least one holding block on said carrier;

said holding bracket being configured as a metal component; and, insulating material interspersed between said holding bracket and said at least one holding block.

22. The exhaust gas system of claim 21, wherein said exhaust gas guide component is a tubular exhaust gas guide component for conducting the flow of exhaust gas.

23. The exhaust gas heater of claim 4, further comprising:

said holding bracket being configured to hold said two mutually adjacent holding block parts on said carrier;

at least one fastening element for fixedly holding said holding bracket on said carrier; and, said two mutually adjacent holding block parts conjointly defining a gap therebetween to facilitate a tight holding of said heating region of said heating conductor by said holding block parts.

24. An exhaust gas heater for an exhaust gas system of a combustion engine, the exhaust gas heater comprising:

a carrier;

a heating conductor supported on said carrier;

said heating conductor defining a heating region arranged on an axial side of said carrier;

said heating conductor being at least in part electrically uninsulated in said heating region thereof;

said heating conductor being configured to be spirally wound in said heating region thereof and to include a plurality of winding turn segments disposed to lie radially staggered;

a holding arrangement having at least one holding unit configured to hold said heating conductor in said heating region on said carrier;

said at least one holding unit including a plurality of electrically conducting holding blocks in contact with said heating conductor in said electrically uninsulated region thereof, each one of the plurality of electrically conducting holding blocks being electrically insulated with respect to said carrier; and, said holding blocks contact engaging corresponding ones of said winding turn segments.

25. The exhaust gas heater of claim 24, wherein each one of the plurality of electrically conducting holding blocks includes two mutually adjacent electrically conducting holding block parts for receiving said heating region therebetween.

26. An exhaust gas heater for an exhaust gas system of a combustion engine, the exhaust gas heater comprising:

a carrier;

a heating conductor supported on said carrier;

said heating conductor defining a heating region arranged on an axial side of said carrier;

said heating conductor being at least in part electrically uninsulated in said heating region thereof;

a holding arrangement having at least one holding unit configured to hold said heating conductor in said heating region on said carrier;

said at least one holding unit including at least one electrically conducting holding block in contact with said heating conductor in said electrically uninsulated region thereof;

said at least one holding block being electrically insulated with respect to the carrier; and, wherein said at least one electrically conducting holding block includes two mutually adjacent electrically conducting holding block parts for receiving said heating conductor at said heating region therebetween.

\* \* \* \* \*

UNITED STATES PATENT AND TRADEMARK OFFICE
CERTIFICATE OF CORRECTION

| | | |
|---|---|---|
| PATENT NO. | : 11,492,942 B2 | |
| APPLICATION NO. | : 17/237610 | |
| DATED | : November 8, 2022 | |
| INVENTOR(S) | : E. Kurpejovic et al. | |

It is certified that error appears in the above-identified patent and that said Letters Patent is hereby corrected as shown below:

On the Title Page

Item (71) Applicant: delete "Neukirchen" and insert -- Neunkirchen -- therefor.

Signed and Sealed this
Twentieth Day of December, 2022

Katherine Kelly Vidal
*Director of the United States Patent and Trademark Office*